Patented Jan. 16, 1951

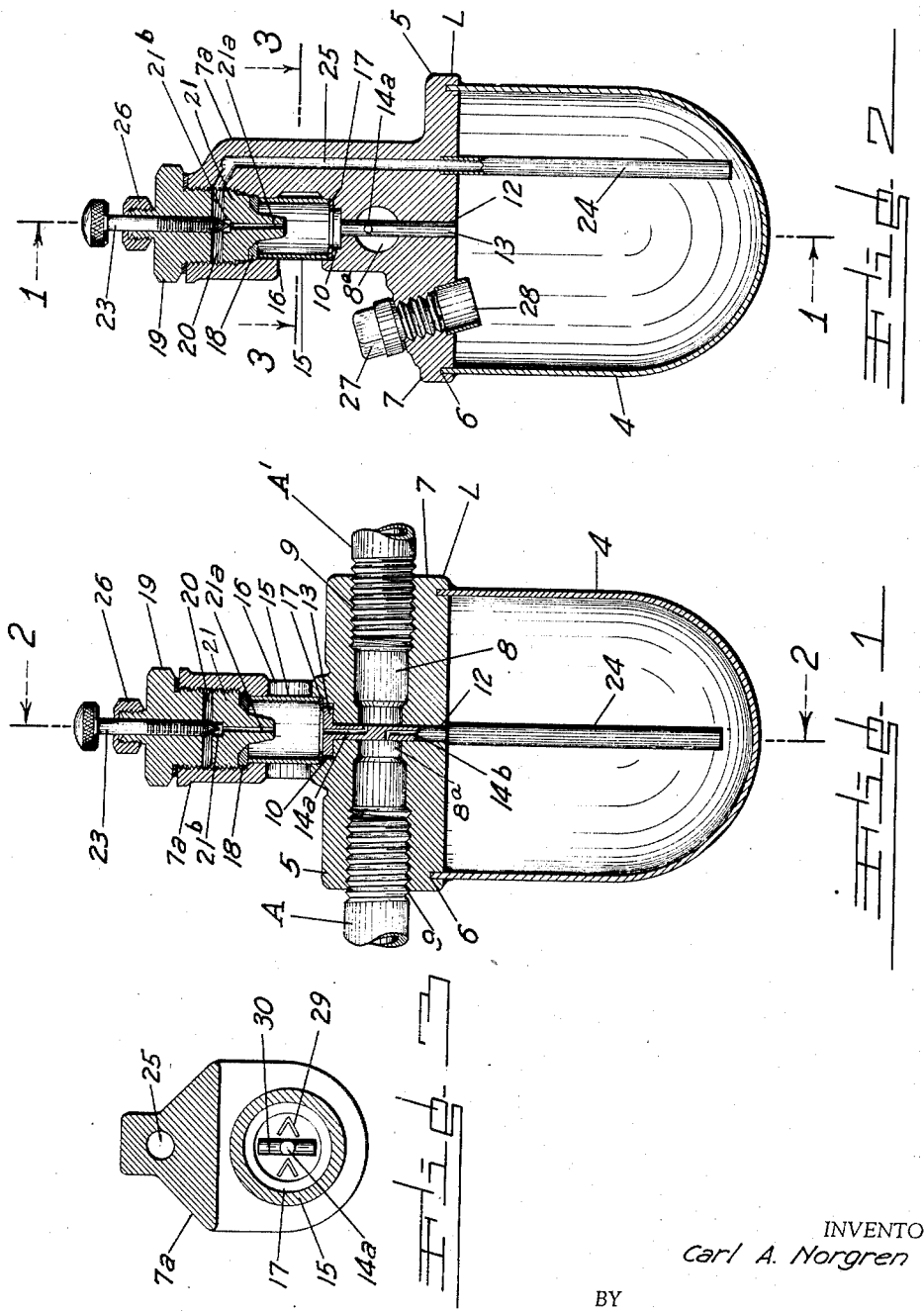

2,538,031

UNITED STATES PATENT OFFICE 2,538,031

AIR LINE LUBRICATOR

Carl A. Norgren, Denver, Colo.

Application March 5, 1946, Serial No. 652,121

3 Claims. (Cl. 184—55)

This invention relates to air line lubricators, and more specifically to lubricators of the type installed in systems in which compressed air is used as a motive force in actuating air cylinders such as used on presses, lathe chucks, and similar devices; also as employed for the lubrication of air actuated tools of all kinds and descriptions.

Although this invention relates specifically to the field of lubrication of working parts, it also serves a useful purpose in coating all parts exposed to the air with a film of lubricant so as to prevent the action of gaseous or entrained moisture in the air from acting on the exposed parts, thereby causing deterioration or rust. This protection is of utmost importance when the machine or device is not in operation.

In the past it has been customary to provide means for introducing lubricant into the compressed air stream flowing to such working parts. For example, in my prior Patent No. 2,223,700, I have shown an air line lubricator of similar character well suited for performing the oil feeding function. In practice, especially in connection with the lubrication of air cylinders where air is sometimes discharged or exhausted back through the lubricator to an appropriate control valve, conditions in conventional lubricators would cause an excess of oil to be discharged into the air line during the exhaust operation. This was due to the fact that line air pressure would be partially trapped above the oil in the bowl which would not be released as quickly as the pressure would fall in the air line. Hence a surplus of oil momentarily would be forced into the air stream until the air pressures in the bowl and the air line became equalized.

In my present invention, when this reversal of air takes place, the arrangement is such that the siphoning and pressure ports, which cause the unit to function as a lubricator when the air is moving in the proper direction, are reversed in function so that the air is forced into the port which nominally supplies the oil, and the lower port nominally providing entrance of air pressure to the bowl becomes a siphoning medium for quickly exhausting the air pressure from the bowl, thereby equalizing the pressure in the line and in the bowl before any excess oil can be discharged into the air line. This arrangement insures proper lubrication only when the air is flowing in the direction of the working stroke.

Another object of the invention is to provide a method by which right or left hand installations may be made with the same lubricator by means of a simple adjustment.

A further object of the invention is to provide a flow-directional control mechanism for air line lubricators which has indicia for indicating the correct operating position.

Other objects reside in novel details of construction and novel combinations and arrangements of parts, all of which will be apparent from the following description.

To afford a better understanding of the invention, reference is made to the accompanying drawings illustrating a preferred embodiment of my invention. In the drawings, in the several views of which like parts are similarly designated:

Fig. 1 is a vertical central section through a lubricator installed in an air line, which lubricator embodies features of my invention;

Fig. 2 is a section taken along the line 2—2, Fig. 1; and

Fig. 3 is a section taken along the line 3—3, Fig. 2 and drawn to an enlarged scale.

As shown in Fig. 1, an air line lubricator L embodying features of the present invention may be connected in an installation comprising an air supply line section A and a delivery line section A'. The lubricator of this invention includes a lower bowl 4, for convenience shown formed out of steel, but which may be composed of other suitable metal or suitable transparent material such as plastic or glass. A metallic body member 5 provided with a lower disc or cap portion 7 is fitted on the end of the bowl 4 as shown at 6. The body member has an extension portion 7a through which a bore 8 having a restricted portion 8a traverses the body, terminating in the threaded portions 9 at each end for the purpose of receiving the threaded ends of the air line section A and A'.

The extension portion of 7a extends upwardly from a point adjacent to the central portion of disc 7 and terminates at its upper extremity in a projection extending over the central portion of the body as shown. Centrally located on the extension 7a there is a recess seat 10 and a central bore 12 extending downwardly from seat 10 through disc 7. A headed reversible tube 13 is fitted into this bowl with its head resting on seat 10.

The tube 13 is provided with a downwardly ranging passage 14a having a laterally extending outlet, and an upwardly ranging passage 14b also having a laterally extending inlet opening on the side of the tube opposite to the side in which the outlet of passage 14a is located. The lower end of tube 13 opens into bowl 4 while the upper end of the tube terminates in a headed portion communicating with the hollow interior of a transparent sight tube 15 mounted in a recess 16 of extension 7a. An annular gasket 17 is positioned in the bore 10 on top of the head of tube 13 on which transparent tube 15 rests. Another gasket 18 is disposed between the upper end of the transparent tube 15 and the threaded gland 21.

Gland 21 is provided with a centrally located hole terminating in the extended lower portion as at 21a. Between gland 21 and plug 19 is an annular space 20 communicating with the interior of the bowl 4 by means of passage 25 and tube 24. Plug 19 is provided with a needle valve 23, the lower extremity of which axially communicates with the hole in gland 21 as at 21b. This needle valve 23 is provided with a packing nut 26 to prevent escape of lubricant or air. The purpose of the needle valve 23 is for manual adjustment of the rate of flow of the lubricant through the gland 21 to the interior of the transparent tube 15.

Lubricant is supplied to bowl 4 through a threaded opening normally capped by threaded plug 27. An apron is provided at the lower extremity of this opening for the purpose of trapping an air space between the oil level in the bowl and the body disc 7.

In order to adapt the lubricator hereinbefore described so that it may be used in either right or left hand installations, the position of the headed tube 13 may be reversed on seat 10 so as to change the relative position of passage 14a and 14b. The operating position of the tube 13 in either direction is indicated by the arrows 29 or other suitable indicia as will be best understood by reference to Fig. 3. A screwdriver slot 30 is also provided for convenience in making the necessary adjustments.

When the air is flowing through the bore 8 of the lubricator, with the tube 13 positioned as shown in Fig. 1 of the drawing, the following action takes place: The air moving from left to right enters the laterally extending inlet of passage 14b, thereby exerting full line pressure on the surface of the oil contained in bowl 4. As the air passes through the restricted section of bore 8, the velocity of the air is naturally increased. Since the tube 13 is located in a transverse position to the flow of the air with the laterally extending outlet of passage 14a on the lee or downstream side of the tube 13, there will be created an area of low pressure on the lee side of this tube which communicates with the space in the transpraent tube 15 through the passage 14a, creating a differential of pressure between that exerted on the surface of the oil in the bowl 4 and the space in the transparent tube 15. This differential of pressure, in which the pressure in the transparent tube 15 will be less than the pressure in the bowl 4, will cause the oil in bowl 4 to rise in the tube 24, through the passage 25, into the annular space 20, pass the needle valve at 21b into the interior of the transparent tube 15, and down through the passage 14a where it is drawn into and atomized by the movement of the air through the restricted area of bore 8. When so positioned, it is obvious that any reversal of the flow of the air will cause the air to immediately enter the passage 14a, destroy the differential in pressure between that area and the interior of the bowl 4, reverse the Venturi action by siphoning the air out of the bowl 4 through the passage 14b until atmospheric pressure or a new equilibrium of pressure is established. This prevents any possibility of flooding of the bore 8 by a sudden reversal of the air flow.

Another function obtained by the positioning of the passageway 14b as shown, with the laterally extending inlet positioned at some point above the surface of the restricted bore 8a, is of extreme importance to the practical use of this type lubricator. When this laterally extending inlet is so positioned, any entrained moisture or impurities common to air lines which may travel along the surface of the interior of the bore 8 will pass through the restricted area 8a with a minimum of likelihood of entering the laterally extending inlet of the passage 14b. This positioning of the inlet fully prevents contamination of the lubricant in the bowl 4 which would happen if entrained moisture or impurities could enter this inlet.

The provision of a slot 30 in the head of member 13 permits selective adjustment and reversal of the right or left hand positions of passages 14a and 14b. This is done by removing plug 19 and gland 21, and inserting a screwdriver through the sight tube 15 so as to rotate said tube to the reverse position. The indicatory means 29 readily shows when the proper setting has been attained. After the required setting has been made, the gland 21 and the plug 19 are returned to their normal operating positions and the lubricator is then ready for regular operation in the reverse line arrangement.

It should be noted that the provisions of the annular space of the gasket 17 are sufficient to contact the annular surface of sight tube 15 to insure proper sealing effect, while at the same time leaving the indicatory means 29 exposed, thereby assuring proper setting of the position of the passages 14a and 14b at all times. In addition, the resistance provided by gasket 17 holds tube 13 against any accidental turning during the operation of the lubricator, thus insuring full and correct action of the lubricator at all times.

In any lubricator of the type described, it is necessary to have a minimum air velocity in the air line passage through the restricted portion of the lubricator 8a. It is possible to make present lubricators in standard sizes for standard applications. If it is desired through any change in operating conditions to accommodate a given lubricator to a smaller or reduced air velocity, this may be done very easily by the simple expedient of inserting a cylindrical bushing in the bore 8a having aligned openings through which tube 13 may be inserted. The reduced area in the section 8a thus established will increase the velocity of the air stream so as to exceed the low limit required to set up operating conditions.

The features of the lubricator construction thus described are capable of variation in carrying out the purpose of the present invention. The drawings illustrate a typical embodiment of the invention and are not intended to limit the same, the scope of which has been set forth in the hereunto appended claims.

What I claim and desire to secure by Letters Patent is:

1. In an air line lubricator of the type having a body provided with alined inlet and outlet passages and a portion of reduced diameter therebetween, a pendent oil bowl sealed to the body, an oil conduit for conveying oil from the bowl into the body, and a regulating valve in the oil conduit for controlling the travel of oil from the bowl into the portion of the passageway of reduced diameter, the improvement which comprises a headed conduit member seated in an upper surface of the body and extending through the portion of reduced diameter into the bowl, said member having one passage extending downwardly from the top of the head and terminating in a laterally extending outlet opening normally facing the outlet passage of the lubricator, and a second passage extending upwardly from the lower end of the member and terminating in a laterally extending inlet opening normally facing the inlet passage of the lubricator, said member being freely rotatable on its seat through substantially 180° so as to permit reversal of the inlet opening of the member to face the other passage which normally is the outlet passage of the lubricator whenever the direction of flow through the air line is reversed.

2. In an air line lubricator of the type having a body provided with alined inlet and outlet passages and a portion of reduced diameter therebetween, a pendent oil bowl sealed to the body, an oil conduit for conveying oil from the bowl into the body, and a regulating valve in the oil conduit for controlling the travel of oil from the bowl into the portion of the passageway of reduced diameter, the improvement which comprises a headed conduit member seated in an upper surface of the body and extending through the portion of reduced diameter into the bowl, said member having one passage extending downwardly from the top of the head and terminating in a laterally extending outlet opening normally facing the outlet passage of the lubricator, and a second passage extending upwardly from the lower end of the member and terminating in a laterally extending inlet opening normally facing the inlet passage of the lubricator, said member being freely rotatable on its seat through substantially 180° so as to permit reversal of the inlet opening of the member to face the other passage which normally is the outlet passage of the lubricator whenever the direction of flow through the air line is reversed, and indicia on the head for indicating the direction of the outlet opening of said conduit member.

3. In an air line lubricator of the type having a body provided with alined inlet and outlet passages and a portion of reduced diameter therebetween, a pendent oil bowl sealed to the body, an oil conduit for conveying oil from the bowl into the body, and a regulating valve in the oil conduit for controlling the travel of oil from the bowl into the portion of the passageway of reduced diameter, the improvement which comprises a headed conduit member seated in an upper surface of the body and extending through the portion of reduced diameter into the bowl, said member having one passage extending downwardly from the top of the head and terminating in a laterally extending outlet opening normally facing the outlet passage of the lubricator, and a second passage extending upwardly from the lower end of the member and terminating in a laterally extending inlet opening normally facing the inlet passage of the lubricator, said member being freely rotatable on its seat through substantially 180° so as to permit reversal of the inlet opening of the member to face the other passage which normally is the outlet passage of the lubricator whenever the direction of flow through the air is reversed, and a slot in the head of said member for reception of a tool for rotating said conduit member.

CARL A. NORGREN.

REFERENCES CITED

The following references are of record in the file of this patent:

UNITED STATES PATENTS

| Number | Name | Date |
|---|---|---|
| 1,666,959 | Clark | Apr. 24, 1928 |
| 1,782,741 | Norgren | Nov. 25, 1930 |
| 1,907,464 | Terry | May 9, 1933 |
| 2,223,700 | Norgren | Dec. 3, 1940 |
| 2,304,644 | Heftler | Dec. 8, 1942 |
| 2,308,773 | Norgren et al. | Jan. 19, 1943 |